Jan. 15, 1924. 1,480,878
M. BLUMENTHAL
MEANS FOR AND METHOD OF PRODUCING CONCRETE PILES
Filed Aug. 5, 1919 2 Sheets-Sheet 2
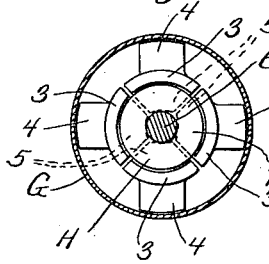
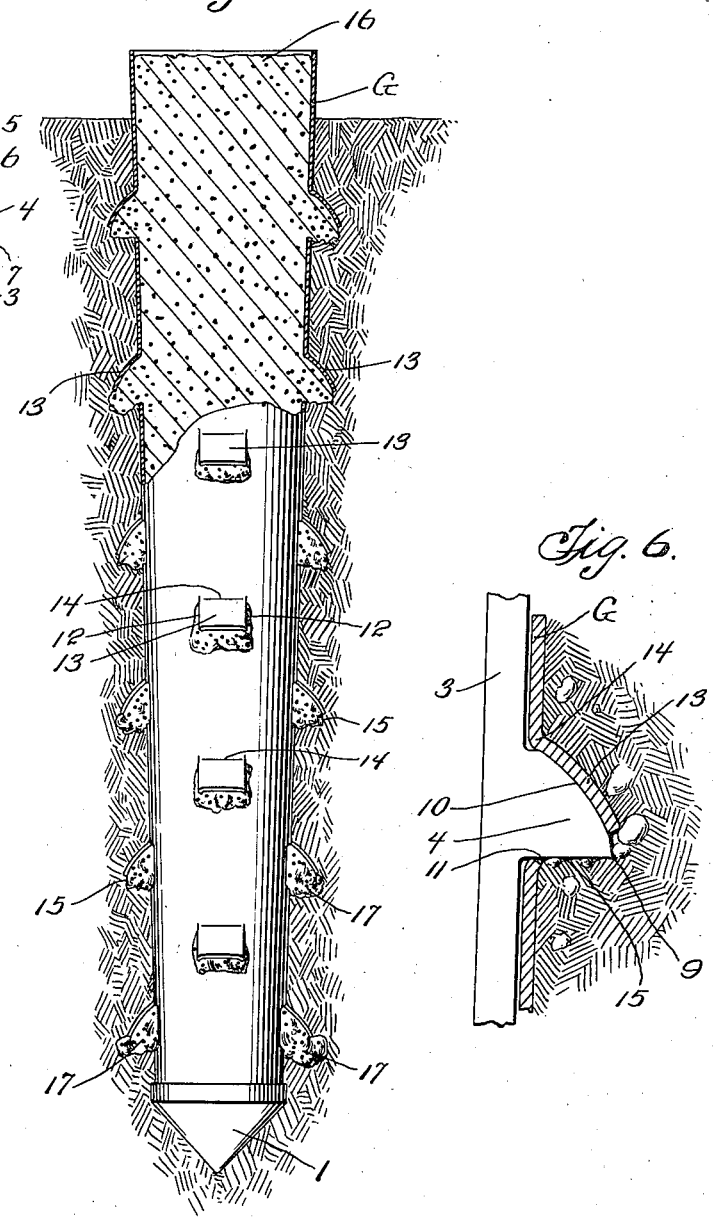
Inventor
Maurice Blumenthal
By his Attorney Patented Jan. 15, 1924.

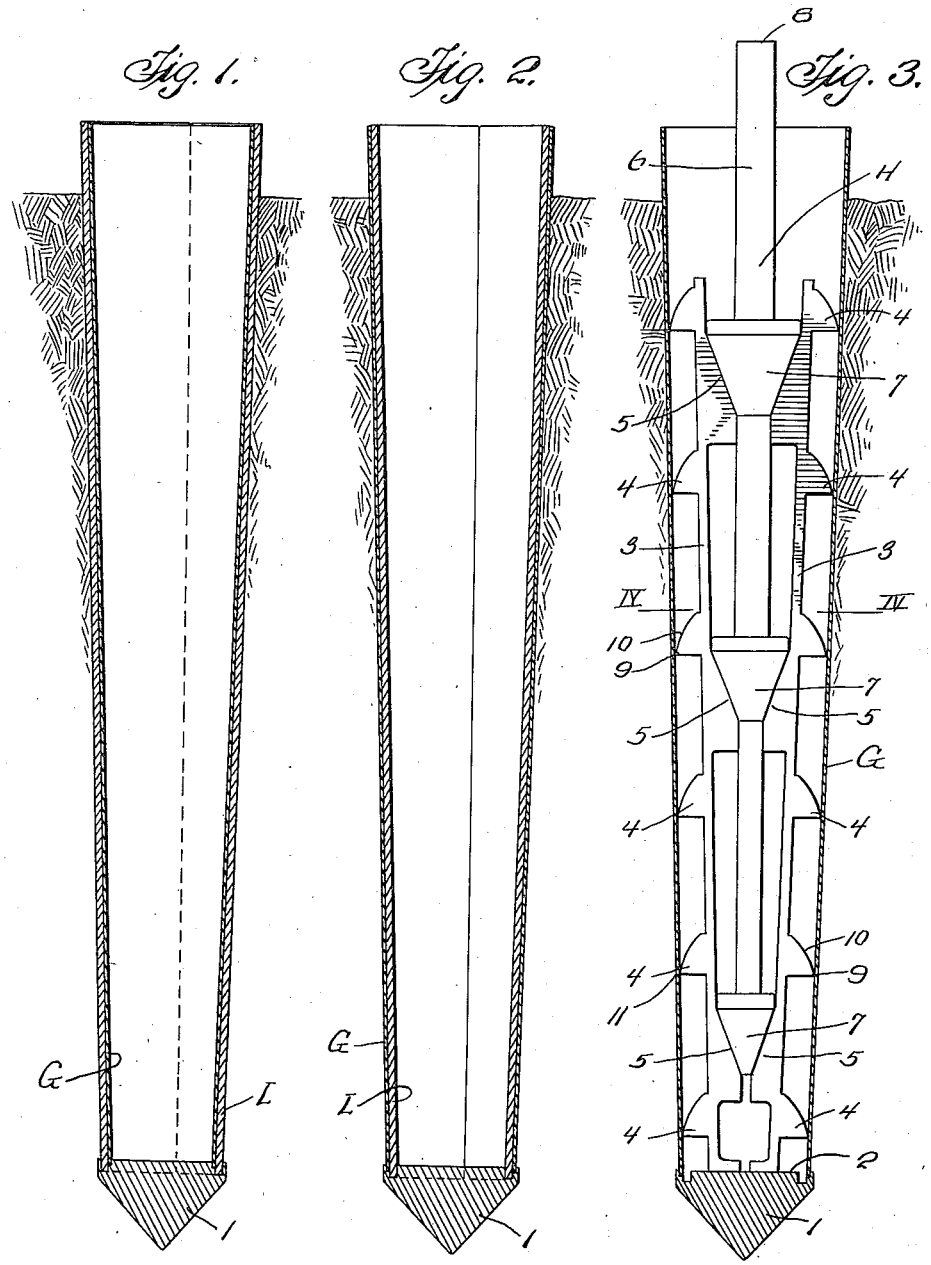

UNITED STATES PATENT OFFICE.

MAURICE BLUMENTHAL, OF BROOKLYN, NEW YORK.

MEANS FOR AND METHOD OF PRODUCING CONCRETE PILES.

Application filed August 5, 1919. Serial No. 315,460.

*To all whom it may concern:*

Be it known that I, MAURICE BLUMENTHAL, residing at Brooklyn, in the county of Kings and State of New York, have invented certain new and useful Improvements in Means for and Methods of Producing Concrete Piles, of which the following is a specification.

This invention relates to a means for and method of producing concrete piles in the earth.

An object of the invention is to provide a pile which shall have protuberances upon its surface extending laterally from the pile into the surrounding earth so as to provide additional bearing surfaces of the pile against the earth to thereby increase the efficiency of the pile in withstanding weights applied to the upper end thereof in use.

A further object is to provide a pile as suggested and in which the extending portions are formed of the concrete material of the pile with suitable metallic reinforcing means.

A further object is to provide a pile consisting of a body of concrete material encased in a metallic shell and portions of the shell being bent outward and disposed to constitute reinforcing means for extending portions of the concrete material.

A further object is to provide a simple and efficient method whereby to insure the formation of the extending portions of the pile.

A more detailed object is to provide a method in which portions of the shell are positively bent outwardly into the surrounding earth by mechanical means, such as plungers, after the shell has been positioned within the earth, thus forming pockets within the earth opening into the interior of the shell so that the concrete material poured into the shell will flow readily into said pockets.

Other objects and aims of the invention, more or less specific than those referred to above will be in part obvious and in part pointed out in the course of the following description of the elements, combinations, arrangements of parts and applications of principles constituting the invention, and the scope of protection contemplated will be indicated in the appended claims.

In the accompanying drawings which are to be taken as a part of this specification, and in which I have shown merely a preferred form of embodiment of the invention:—

Figure 1 is a longitudinal sectional view illustrating a pile in course of construction in accordance with this invention.

Figure 2 is a similar view to that shown in Figure 1 but illustrating the shell which is to remain within the earth being positioned exteriorly of the pile former whereas in Figure 1 the former is exteriorly of the shell.

Figure 3 is a view similar to that shown in Figure 2 but the pile former being removed and there being illustrated a mechanical means in position preparatory to punching out portions of the shell.

Figure 4 is a transverse sectional view taken substantially upon the plane of line IV of Figure 3.

Figure 5 is a side elevational view, partly in section, illustrating a completed pile, and Figure 6 is an enlarged detail sectional view for illustrating the manner in which the portions of the shell are bent outwardly during the formation of pockets within the surrounding earth.

While the drawings forming part hereof illustrate the pile former as being of the sectional type, and the pile as being tapered, yet it will, of course, be understood that a non-section former may be employed in many instances and that the objects of this invention may be attained equally well in a non-tapered pile.

Referring to the drawings for describing in detail the structure and features which are illustrated therein, the reference character L indicates the pile former and the reference character G indicates the shell which is to remain within the earth, it being understood that after the pile is driven the former L is removed.

The shell G may be positioned either within or without the former, as may be desired.

The reference character 1 indicates a conical nose piece which is fitted to the lower end of the former and which precedes the former into the earth. The nose piece 1 remains within the earth after the former is withdrawn.

After the shell is in place and the former has been withdrawn a mechanical punching mechanism H is lowered into the shell to rest upon the flat upper surface 2 of the nose piece.

This punching mechanism comprises a plurality of side members 3 each being formed exteriorly with a series of punches 4 and interiorly with a series of cam surfaced portions 5. Intermediate the side members 3 is a longitudinally movable operating rod 6 having a series of inverted cones 7 thereon disposed to engage the cams 5.

After the mechanism H has been inserted within the shell the rod L is driven downwardly, as for instance by blows applied upon the upper end, as 8, of said rod, causing the cones to squeeze between the respective cams and thereby forcing the members 3 away from each other so that all of the punches 4 are caused to cut thru portions of the shell and to protrude outwardly into the surrounding earth, as is clearly seen in Fig. 6 of the drawings.

The shape of the punches is preferably such that a cutting edge, as 9, is provided only at the lower portion of each punch. Above these edges 9 the punches taper backwardly, as at 10, so that the effect of the outward movement of the punches will be simply to sever the material of the shell engaged by the edges 9, as at 11, to shear, or tear, the material of the shell along the sides of the punches, as at 12, causing the displaced portions 13 of the material of the shell to be bent outwardly over the surfaces 10 of the punches and leaving said portions 13 unsevered along their upper edges, as at 14. After the mechanism H has completed its purpose and has been withdrawn, the portions 13 of the shell serve effectively to retain the earth supported out of the pockets 15 which have been formed in the shell by the punches and maintain said pockets all free and open to receive the concrete material which is to be poured into the shell.

The surfaces 10 are incidentally of such shape and are so cooperative with the portions 13 that they serve automatically to move the punches backwardly into the shell when strain is applied to the members 3 for lifting said members out of the shell. Thus it becomes unnecessary to provide any particular mechanism for effecting the withdrawal of the punches.

After the mechanism H has performed its full office, as just described, and has been removed, the concrete material, as 16, is poured into the shell filling the same substantially to the level of the upper end of the shell. If desired, the concrete may be tamped or otherwise forced downwardly during or after the pouring operation so as to cause the concrete to press upon the walls in the pockets 15. In some instances the pressure may be sufficient to cause the concrete to enlarge the pockets, or to flow into voids which communicate with the pockets.

In this way the extending portions, as 17, of the concrete material may be enlarged and the earth comprising the walls of the pockets may be compressed and solidified so that the pile as completed will be capable of sustaining great weight upon its upper end.

While the shell G illustrated is preferably formed of sheet metal, it is to be understood that the spirit of this invention is not limited to the use of sheet metal particularly since in certain cases it would be entirely practical to employ a shell made of paper, such for instance as that described and claimed in my pending application 306,134.

As many changes could be made in this construction without departing from the scope of the following claims, it is intended that all matter contained in the above description, or shown in the accompanying drawings, shall be interpreted as illustrative only and not in a limiting sense.

Having thus described my invention, what I claim as new and desire to secure by Letters Patent is:—

1. A concrete pile comprising a hollow tubular shell, a body of concrete material within said shell, the shell having portions of its side walls at points spaced apart circumferentially of the shell bent outwardly providing openings thru said side walls, and a portion of the body of cement projecting thru said openings providing integral extensions of the pile spaced apart circumferentially of the shell lying in engagement with the outwardly bent portions of said shell.

2. A concrete pile comprising a hollow tubular shell, a body of concrete material within said shell, the shell having portions of its side walls bent outwardly providing openings thru said side walls, and a portion of the body of cement projecting thru said openings providing integral extensions of the pile so disposed with respect to said outwardly bent portions of the shell as to be protected thereby.

3. A device for constructing concrete piles, comprising a hollow tubular shell adapted to be sunk into the earth, and a mechanism comprising parts operable for forming pockets within the earth at predetermined points spaced circumferentially of the shell communicating with the interior of said shell thru correspondingly spaced openings formed thru the shell, said pockets being adapted to receive portions of concrete material subsequently poured into the shell.

4. A device for constructing concrete piles, comprising a hollow tubular shell adapted to be sunk into the earth, and a mechanism comprising parts operable for bending out portions of the walls of said shell at predetermined spaced points circumferentially of the shell so as to form pockets in the surrounding earth also spaced apart circumferentially of the shell and protected by said bent out portions and communicating with the interior of the shell, said pockets being adapted to receive portions of concrete material placed within the shell.

5. A device for constructing concrete piles, comprising means for forming a pile-shaped opening within the earth adapted to receive concrete therein, together with means operable for forming a plurality of pockets within the earth at predetermined spaced points circumferentially in the walls of said opening communicating with the interior of the opening adapted to receive portions of the concrete subsequently placed within said opening.

6. The herein described method of forming a concrete pile, which consists in providing a shell, sinking said shell into the earth, forming pockets in the earth communicating with the interior of the shell, and then filling the shell and pockets with concrete material.

7. The herein described method of forming a concrete pile, which consists in providing a shell, sinking said shell into the earth, punching out portions of the shell into the surrounding earth thereby forming openings in the shell and pockets in the earth communicating thru said openings with the interior of the shell, and then filling the shell and pockets with concrete material.

8. The herein described method of forming a concrete pile, which consists in providing a metallic shell, sinking said shell into the earth, bending out integral portions of the shell into the surrounding earth to form pockets in the earth protected and maintained by said bent out portions of the shell, and then filling the shell and pockets with concrete material.

In testimony whereof I affix my signature in the presence of two witnesses.

MAURICE BLUMENTHAL.

Witnesses:
L. GESSFORD HANDY,
MAY SCHULZ.